(12) United States Patent
Kohnke et al.

(10) Patent No.: US 6,445,493 B2
(45) Date of Patent: *Sep. 3, 2002

(54) BALANCED GAIN FLATTENING FILTERS

(75) Inventors: Glenn E. Kohnke; Qi Wu, both of Painted Post, NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,051

(22) Filed: Oct. 25, 1999

Related U.S. Application Data

(60) Provisional application No. 60/117,773, filed on Jan. 29, 1999.

(51) Int. Cl.[7] .................................................. H01S 3/00
(52) U.S. Cl. ........................ 359/337.1; 359/341.1; 359/161; 359/337.2
(58) Field of Search ............................... 359/341, 337, 359/161, 337.1, 341.1, 337.2

(56) References Cited

U.S. PATENT DOCUMENTS

| | | | |
|---|---|---|---|
| 5,583,689 A | | 12/1996 | Cassidy et al. |
| 5,757,540 A | | 5/1998 | Judkins et al. |
| 5,880,874 A | * | 3/1999 | Shibuya et al. ............. 359/337 |
| 5,912,750 A | * | 6/1999 | Takeda et al. .............. 359/124 |
| 6,034,812 A | * | 3/2000 | Naito ......................... 359/341 |
| 6,151,157 A | * | 11/2000 | Ball et al. ................... 359/341 |

FOREIGN PATENT DOCUMENTS

GB      2314225      12/1997

* cited by examiner

*Primary Examiner*—Mark Hellner
(74) *Attorney, Agent, or Firm*—Svetlana Short

(57) ABSTRACT

Compound gain flattening filters of optical amplification include a series of filter components with spectral responses that are combined to approach a target loss spectrum. Small variations in the central wavelengths of the component responses can produce large errors in the combined response of the compound gain flattening filter. However, the components can be divided into sub-components with balanced central wavelength deviations to achieve the desired response goals despite exhibiting otherwise detrimental wavelength deviations.

61 Claims, 5 Drawing Sheets

BALANCED GAIN FLATTENING FILTERS

This application claims the benefit of Provisional No. 60/117,773 filed Jan. 29, 1999.

TECHNICAL FIELD

Optical amplifiers produce spectrally related variations in gain that can be reduced by gain flattening filters having compensating spectral responses. The gain flattening filters, which are sometimes required to exhibit complex response profiles, can be assembled from filter components that exhibit simpler response profiles.

BACKGROUND

The complex spectral responses that are sometimes required of gain flattening filters can be approximated by concatenating filter components with simpler filter responses. Such compound gain flattening filters can be formed by concatenating conventional filters with spectral response profiles distinguished by their peak losses and their central wavelengths.

Best fit algorithms solve for the peak loss and central wavelength characteristics of the filter components to approximate a target loss spectrum. However, manufacturing even simple filter components with Gaussian response profiles can be difficult to achieve to desired accuracy. The resulting filter errors (i.e., insertion loss error function), which are largely due to unintended shifts in the central wavelengths of the filter components, can leave excessive gain ripple representing uneven amplification of the desired transmission spectrum.

Long period gratings with Gaussian response profiles can be used as filter components of compound gain flattening filters. Manufacturing these filter components to central wavelength accuracies less than one-half nanometer is difficult, and errors of only one Angstrom can produce significantly deteriorated results. Discarding gratings outside of tolerance and trial and error tuning are two approaches to meeting desired tolerances. Both are time consuming and expensive—the first due mainly to wasted efforts and the second due mainly to repeated efforts.

SUMMARY OF THE INVENTION

We have discovered that compound gain flattening filters can be assembled from a series of simpler filter components having wider tolerances than those normally prescribed but without the expected errors. Residual gain ripple from new amplifier and filter combinations can be minimized by approaching a best fit loss spectrum for the filters. Higher manufacturing yields are possible by utilizing filter components that would normally be considered outside acceptable tolerance.

Our new compound gain flattening filters can be manufactured using certain conventional steps including determining a filter desired loss spectrum and using a conventional algorithm to fit the desired loss spectrum with a series of filter components having individual spectral responses with peak losses specified at different wavelengths. However, instead of manufacturing a single set of filter components matching these specifications, at least a first of the filter components is fashioned from a pair of filter sub-components with similar spectral responses. The peak losses of the filter sub-components sum to the intended peak loss of the first filter component, and the central wavelengths of the filter sub-components also average to the specified central wavelength of the first filter component. However, the central wavelengths of the filter sub-components are offset in opposite directions with respect to the specified central wavelength of the first filter component for utilizing filter sub-components with wider range tolerances. The resulting response of the compound gain flattening filter is closer to the desired loss spectrum than if the central wavelength of the first filter were similarly offset in either direction.

Compound gain flattening filters can be made in accordance with our invention by dividing an entire series of filter components into two sets of filter sub-components. The central wavelengths of all of the filter sub-components of the first set are shifted in a positive direction and the central wavelengths of the filter sub-components of the second set are shifted in a negative direction, both with respect to the prescribed central wavelengths of the filter component series. Together, the two sets of filter sub-components produce an actual spectral filter response that is closer to the desired loss spectrum than if the central wavelengths of the series of filter components were similarly shifted in either direction.

The two sets of filter sub-components are particularly useful for reducing gain ripple of paired amplifiers having similar gain outputs, especially amplifiers separated by a fiber span. One set is positioned within one of the amplifiers, and the other set is positioned within the other amplifier. The gain ripples of the two amplifiers are separately reduced, avoiding amplifier-to-amplifier transmissions that are not appropriately corrected.

The filter sub-components of our invention are preferably made according to usual manufacturing practices, but are sorted following manufacture according to their shift from prescribed central wavelengths. For example, those shifted in a positive direction can be paired with those shifted by a similar amount in a negative direction so that the average central wavelength of the pair approaches the prescribed central wavelength. A similar balance can be achieved by larger combinations of sub-components having central wavelengths distributed about a prescribed mean.

Instead of or in addition to sorting by pairs or other combinations, tuning can be used to intentionally offset the central wavelength of one member of a combination to balance an opposite direction of offset exhibited by one or more other members of the combination. Tuning can also be practiced upon the one member to balance the filter central wavelengths in a static or dynamic fashion to accommodate changing conditions of use.

The sensitivity of the actual filter response to central wavelength errors varies among the series filter components. Central wavelength errors of filter components with particularly sharp profiles or large losses can contribute to insertion loss errors more than other filter components with similar wavelength errors but with flatter profiles. Thus, wider tolerances of central wavelength can be accommodated for filter components with flatter profiles. In the practice of our invention, just the filter components having the sharper profiles can be subdivided into balanced wavelength sub-components for reducing the number of required filter components and sub-components without requiring stricter tolerances for the sharper profile filter components.

The desired loss spectrum for the compound gain flattening filters represents the best fit of a combination of theoretical filter components varying in peak loss and central wavelength. However, the best fit of the series of filter components is still an approximation of a target loss spectrum required to entirely eliminate gain ripple.

DRAWINGS

DETAILED DESCRIPTION

Figure 1:
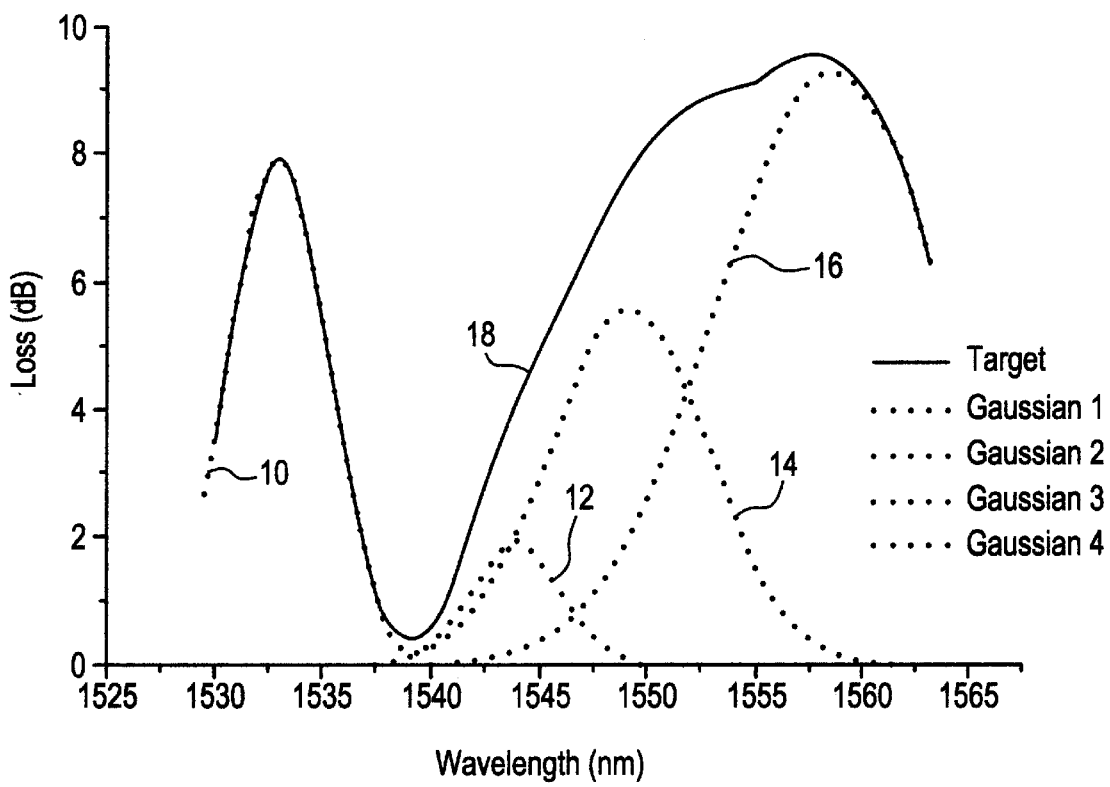
FIG. 1 is a graph of individual spectral responses of individual filter components intended to provide an approximate fit to a target loss spectrum.

A typical compound gain flattening filter includes a series of filter components that exhibit individual spectral responses such as the spectral responses 10, 12, 14, and 16 depicted in FIG. 1. The depicted responses 10, 12, 14, and 16, which are measured here in terms of decibel loss over a domain of wavelengths, all have Gaussian profiles but are distinguished by different peak losses and different central wavelengths at which the peak losses occur. For example, the spectral response 10 has a peak loss of 8.0 decibels at a central wavelength of approximately 1533 nanometers, and the spectral response 12 has a peak loss of 2 decibels at a central wavelength of approximately 1543 nanometers.

Figure 2:
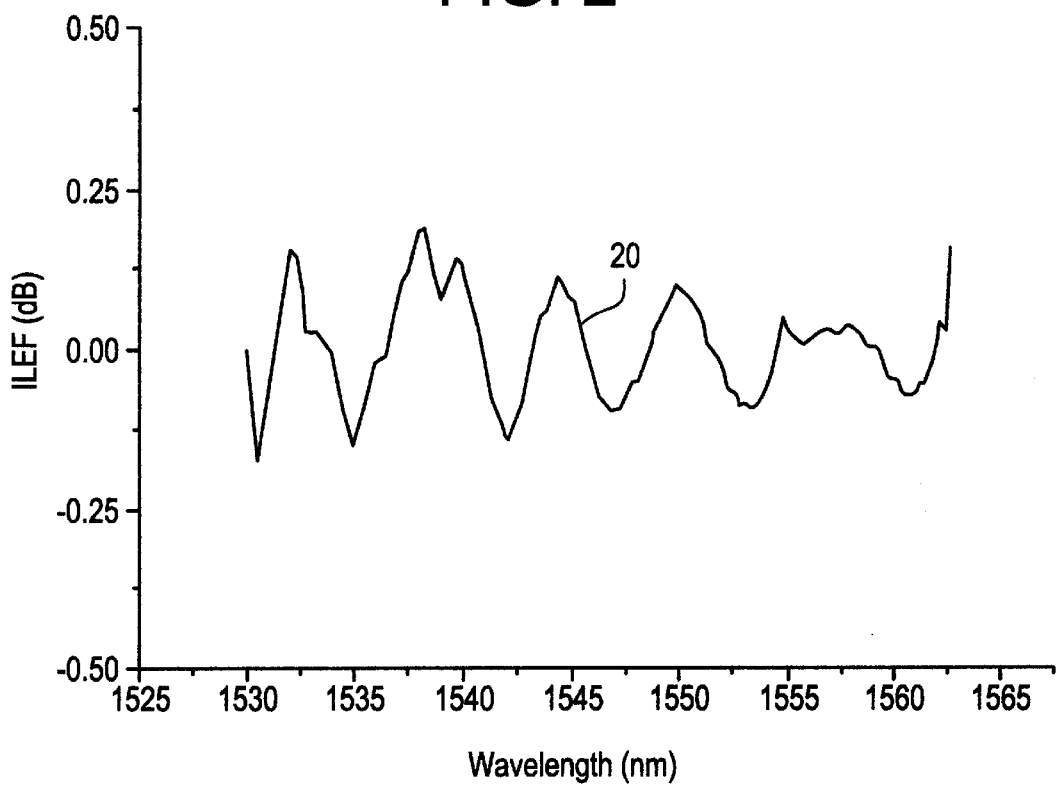
FIG. 2 is a graph of an insertion loss error function representing a difference between the target loss spectrum and the sum of individual spectral responses of the filter components.

Also shown in the graph of FIG. 1 is a target loss spectrum 18, which is chosen to reduce or eliminate gain ripple of a particular amplifier. A best fit algorithm is used to determine the peak losses and the central wavelengths of the component responses 10, 12, 14, and 16 to approximate the target loss spectrum 18. However, the fit is generally not perfect and some error results. FIG. 2 depicts an insertion loss error function 20 representing this error calculated as a difference between the target loss spectrum 18 and the combined responses 10, 12, 14, and 16 of the filter components.

Figure 3:
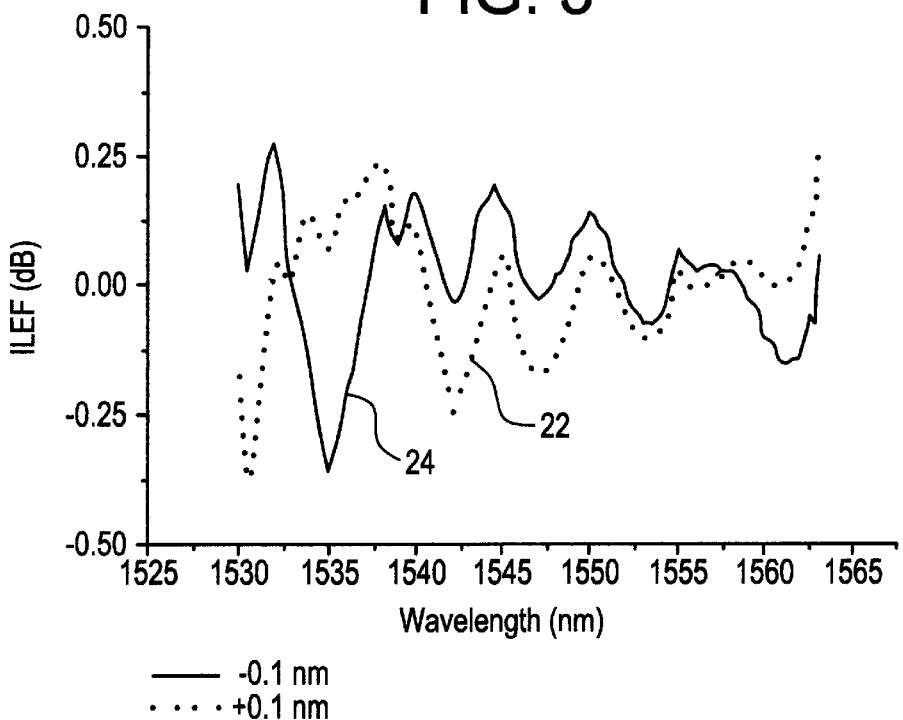
FIG. 3 is a graph of two different insertion loss error functions contrasting the effects of shifting central wavelengths of the component responses in opposite directions by approximately one Angstrom.

The insertion loss error function 20 can easily be worsened by small errors in the component responses, particularly errors in the central wavelengths of the responses. For example, FIG. 3 depicts the effects of 0.1 nanometer (one Angstrom) changes in the central wavelengths of the spectral responses 10, 12, 14, and 16. An insertion loss error function 22 results from a positive shift of the central wavelengths of the four spectral responses 10, 12, 14, and 16 through just one Angstrom, and an insertion loss error function 24 results from a negative shift of the central wavelengths of the same spectral responses by a similar amount. In comparison to the insertion loss error function 20, the insertion loss error functions 22 and 24 are significantly worse, particularly within the range between 1530 and 1540 nanometers of wavelength. This range of wavelengths, which is referred to as the "blue band", corresponds to wavelengths amplified by conventional erbium-doped amplifiers.

Designing and manufacturing even simple Gaussian response filters, such as long period gratings, to central wavelength accuracies less than one Angstrom is presently difficult, requiring, for example, large numbers of filters to be discarded or extensive trial and error efforts to achieve the required accuracy. However, we have found that central wavelength errors of one Angstrom or more can be accommodated by dividing the filter components into pairs of sub-components that are sorted or otherwise arranged to balance the central wavelength errors.

Figure 4:
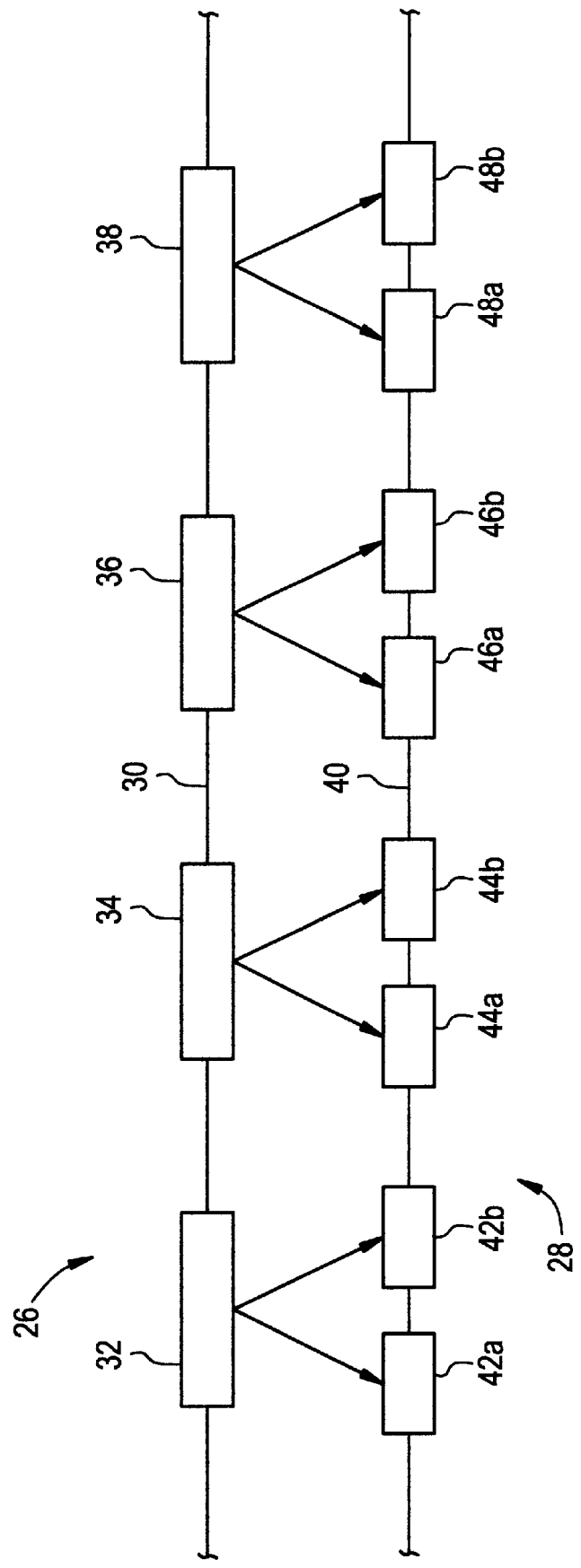
FIG. 4 is a diagram comparing a conventional compound gain flattening filter to a new compound gain flattening filter with components subdivided into pairs.

FIG. 4 depicts an example of a conventional gain flattening filter 26 and its relationship to a gain flattening filter 28 in accordance with our invention. The conventional gain flattening filter 26 is formed along a fiber 30 by a series of filter components 32, 34, 36, and 38 that produce a combined spectral response approximating a desired loss spectrum. However, due to the problems of manufacturing these components to required accuracy, our invention proposes the new gain flattening filter 28, which is formed along a similar fiber 40. The new gain flatting filter 28 replaces the components 32, 34, 36, and 38 with pairs of sub-components 42a and 42b, 44a and 44b, 46a and 46b, and 48a and 48b having similar response profiles. Each of the pairs of sub-components (e.g., 42a and 42b) produce spectral responses that sum to the intended peak loss of the component (e.g., 32) they are replacing and have central wavelengths that average to the central wavelength of their replaced component (e.g., 32). However, one sub-component (e.g., 42a) of the pairs has a central wavelength shifted in a positive direction with respect to the prescribed central wavelength of the replaced component (e.g., 32), and the other sub-component (e.g., 42b) of the pairs has a central wavelength shifted in an opposite direction with respect to the same prescribed central wavelength.

Figure 5:
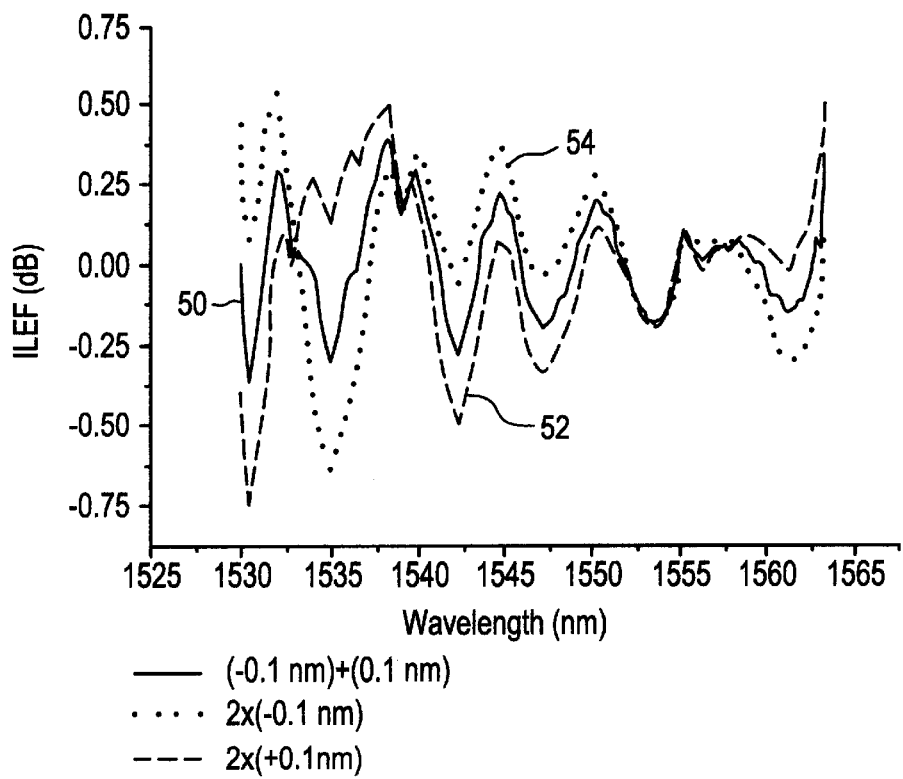
FIG. 5 is a graph that compares the insertion loss error functions resulting from various central wavelength shifts of pairs of filter sub-components replacing the filter components.

FIG. 5 compares an insertion loss error function 50 produced by the new gain flattening filter 28 in which the paired sub-components are shifted in opposite directions by one Angstrom to the insertion loss error functions 52 and 54 produced by shifting both sub-components of each pair in the same positive or negative directions. The latter error functions 52 and 54 equate to the errors expected from shifting the central wavelengths of the filter components 32, 34, 36, and 38 in one direction or the other through the same amount. As shown in the graph of FIG. 5, the balancing of the central wavelengths of the paired sub-components significantly reduces the attendant insertion loss error function 50 with respect to the error functions 52 and 54 associated with similar magnitudes of central wavelength shifts that are not balanced.

Thus, pairing sub-components (e.g., 42a and 42b) with balanced central wavelengths allows for the use of sub-components having a wider range of central wavelengths in compound gain flattening filters. Normally, such filter components with similar deviations in central wavelength would be discarded or subject to further processing; but in accordance with this invention, filter sub-components with wavelength deviations in one direction can be paired together with other filter components with similar wavelength deviations in an opposite direction. The pairing can include sorting the sub-components by central wavelength and assembling the pairs from among the sorted sub-components or tuning the central wavelength of one member of a pair to balance a central wavelength deviation of the other member of the pair.

Figure 6:
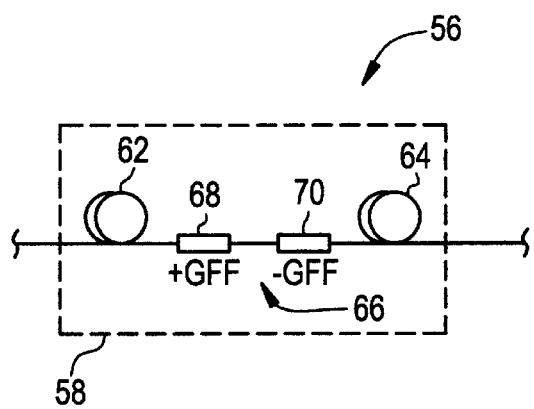
FIG. 6 is diagram of an optical amplification system showing two sets of filter sub-components located between amplifier coils.

The remaining drawing figures depict optical amplification systems incorporating compound gain flattening filters with wavelength balanced filters. For example, an amplification system 56 depicted in FIG. 6 includes an amplifier 58 formed by two erbium doped coils 62 and 64 and a compound gain flattening filter 66 formed by two sets of filter sub-components 68 and 70, each set contributing approximately one-half of the intended peak loss of the filter 66. The sub-components of the set 68 have central wavelengths that are shifted in a positive direction, and the sub-components of the set 70 have central wavelengths that are similarly shifted in a negative direction. All of the sub-components are preferably formed by long period gratings having Gaussian response profiles.

Figure 7:
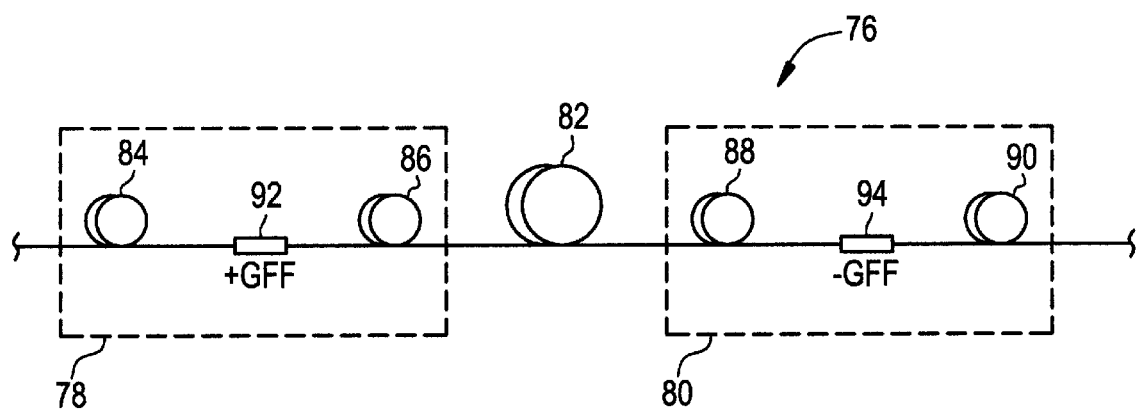
FIG. 7 is a diagram of an optical amplification system showing sets of filter components located within amplifier stages separated by a fiber span.

FIG. 7 depicts an optical amplifying system 76 with concatenated optical amplifiers 78 and 80 separated by a fiber span 82. Each of the amplifiers 78 and 80 is formed by a pair of erbium doped fiber coils 84 and 86 or 88 and 90. A gain flattening filter 92 is positioned between the coils 84 and 86 of the amplifier 78 and has one or more fiber components with central wavelengths shifted in a positive direction. A gain flattening filter 94 is positioned between the coils 88 and 90 of the amplifier 80 and has one or more fiber components with central wavelengths similarly shifted in a negative direction. The two gain flattening filters 92 and 94 produce a combined response that reduce the combined gain ripple of the amplifiers 78 and 80, while also reducing gain ripple transmitted through the fiber span 82.

Figure 8:
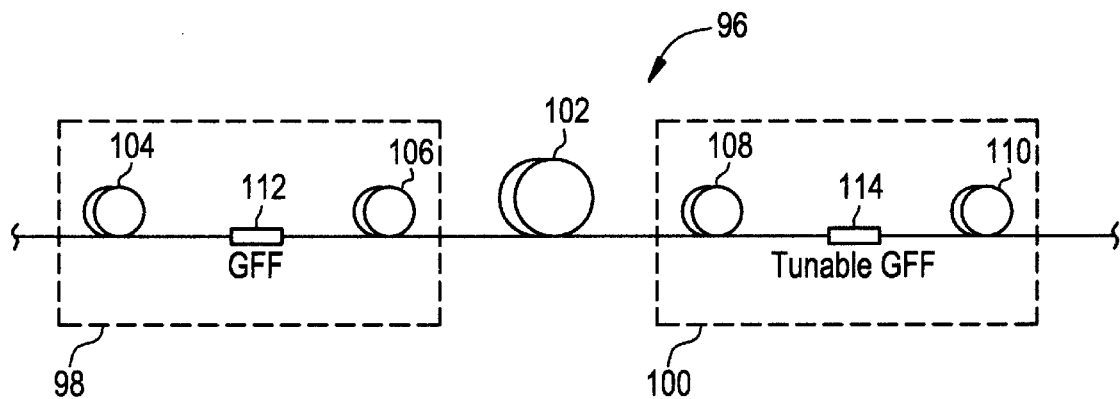
FIG. 8 is a diagram similar to FIG. 6 in which one of the filter sets is tunable.

FIG. 8 depicts an optical amplifying system 96 with a similar arrangement of optical amplifiers 98 and 100 separated by a fiber span 102. Again, the amplifiers 98 and 100 are formed by pairs of doped fiber coils 104 and 106 or 108 and 110; and a gain flattening filter 112 having one or more fiber components with central wavelengths shifted in a positive direction is positioned between the coils 104 and 106 of the amplifier 98. However, in contrast to the preceding embodiment, a tunable gain flattening filter 114 is positioned between the coils 108 and 110 of the amplifier 100. At least one fiber component of the tunable gain flattening filter 114 is tuned to shift the central wavelength of its response in an opposite direction to balance the central wavelength deviations of the gain flattening filter 112. The tuning can be accomplished statically, such as during manufacture, or dynamically, such as during use. Either positive or negative directions of wavelength tuning can be used to compensate for or augment the response of the paired filter 112, which itself can exhibit either positive or negative directions of central wavelength shift.

Figure 9:
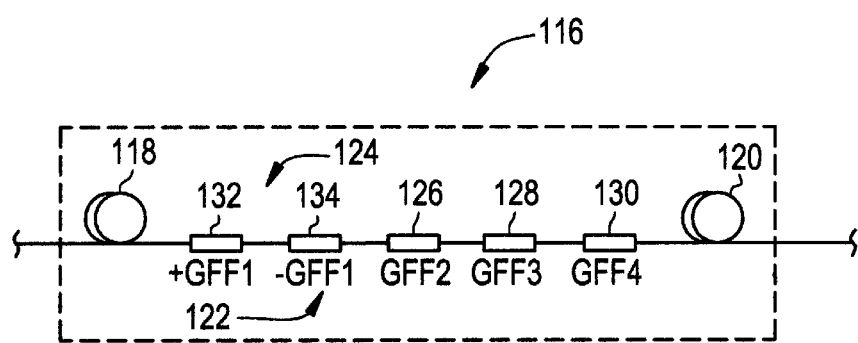
FIG. 9 is a diagram of an optical amplification system in which one of several filter components is divided into a pair of sub-components between amplifier coils.

FIG. 9 depicts an optical amplifying system 116 having a single amplifier formed by a pair of erbium doped fiber coils 118 and 120. A compound gain flattening filter 122, which is positioned between the coils 118 and 120, is formed by a succession of filter components 124, 126, 128, and 130. The filter component 124 is divided into a pair of sub-components 132 and 134 having central wavelengths of response that are shifted in opposite directions. The filter component 124 can be selected among the other components 126, 128, and 130 for subdivision because the accuracy of its central wavelength of response disproportionately effects a desired response of the filter 122 or is most closely associated with the wavelength range of the desired amplification. Other of the filter components 126, 128, or 130 could also be subdivided to contribute further to an improved total response without necessarily manufacturing the sub-components to any higher accuracy than the remaining components. One or the other of the sub-components 132 and 134 of the filter component 124 could also be statically or dynamically tuned to provide the appropriate central wavelength balance among the paired sub-components.

The balancing of any one or more pairs of sub-components can be also taken with regard to variations in the peak losses of the sub-components. For example, a sub-component that exhibits a peak loss of 55 percent of the peak loss of the component it replaces can be paired with a sub-component exhibiting 45 percent of the same peak loss. In addition, the central wavelength of the sub-component exhibiting a greater proportion of the peak loss can be offset a little less than the central wavelength of the sub-component exhibiting a lesser proportion of the peak loss to provide a weighted balancing. Such weighted balancing is subject to tuning both peak loss and central wavelength. The components of gain flattening filters can also be divided into groups larger than pairs for similar purposes.

Both the components and the sub-components proposed for use in this invention are preferably long period gratings having Gaussian response profiles. Generally, a good fit to the target loss spectrum can be achieved with a combination of four independent Gaussian response profiles. These, of course, can be subdivided in accordance with our invention to loosen tolerances. Best fit algorithms are known to those of skill in the art for fitting Gaussian profiles to curves with more complex shapes.

Our new compound gain flattening filters can also be constructed with other filter types and response profiles including fiber Bragg gratings and thin film gratings. The amplifiers of choice presently are erbium amplifiers, but other amplifiers working in the same or different spectrums could also be used.

We claim:

1. A compound gain flattening filter comprising:
   at least first and second sets of filter sub-components together approximating a single set of filter components defined by a best fit algorithm that determines central wavelengths of response for the filter components to approach a desired spectral filter response;
   at least one sub-component of said first set exhibiting a central wavelength of response shifted in a positive direction from the central wavelength of a corresponding component determined by the best fit algorithm;
   at least one sub-component of said second set exhibiting a central wavelength of response shifted in a negative direction from the central wavelength of the same corresponding component determined by the best fit algorithm; and
   said at least first and second sets being combined for producing an actual spectral filter response that is closer to the desired filter response than a filter response of the single set of filter components in which the corresponding filter component exhibits an actual central wavelength similarly shifted in either direction from the central wavelength determined by the best fit algorithm.

2. The filter of claim 1 in which said filter sub-components of the first set exhibit individual filter responses at least approximately matching individual filter responses of paired sub-components from said second set of filter sub-components.

3. The filter of claim 2 in which central wavelengths of more than one pair of filter sub-components from the first and second sets are shifted in opposite directions with respect to central wavelengths of the corresponding component responses determined by the best fit algorithm.

4. The filter of claim 1 in which the best fit algorithm also determines peak losses of the component responses, and peak losses exhibited by the sub-components from both sets sum to the peak losses of the corresponding components determined by the best fit algorithm.

5. The filter of claim 1 in which at least some of said filter sub-components exhibit approximately Gaussian response profiles.

6. The filter of claim 1 in which at least some of said filter sub-components are long period gratings.

7. A compound gain flattening filter of an optical amplification system comprising:
   a series of filter components that produce a combined filter response approximating a desired spectral filter response;
   each of said filter components exhibiting a substantially different filter component response than other of said components of the series;
   said one component being divided into at least two sub-components having similar response profiles that are summed for producing one of the different filter component responses; and
   said response profiles of the sub-components being relatively shifted in wavelength in opposite directions to better approximate the desired spectral filter response than if the filter component response of the one component were similarly shifted in a single direction.

8. The filter of claim 7 in which said response profiles of the sub-components each contribute approximately one-half of a total attenuation exhibited by the filter component response of the one component.

9. The filter of claim 7 in which said response profiles of the sub-components are relatively shifted in wavelength by less than one nanometer.

10. The filter of claim 7 in which said response profiles of the sub-components include respective peak losses that are shifted in wavelength by less than one nanometer.

11. The filter of claim 7 in which said sub-components are long period gratings.

12. The filter of claim 11 in which other of said filter components also include long period gratings.

13. The filter of claim 7 in which each of said filter component responses has a Gaussian profile.

14. The filter of claim 7 in which at least one of said sub-components is dynamically tuned to compensate for changing spectral requirements of the amplifying system.

15. An optical amplifying system comprising:
   an optical amplifier exhibiting a variation in gain over a domain of wavelengths;
   a pair of first and second filters exhibiting substantially similar response profiles that contribute to reducing the variation in gain over the domain of wavelengths;
   each of said first and second filters exhibiting at least one peak wavelength of loss that differs from a common peak wavelength of loss that minimizes the variation in gain with a single filter; and
   said peak wavelengths of the first and second filters being offset in opposite directions from the common peak wavelength for reducing the variation in gain with respect to a similar offset of the peak wavelengths in the same direction from the common peak wavelength.

16. The system of claim 15 in which said amplifier includes first and second amplifier stages separated by a fiber span, and both of said first and second filters are positioned along said fiber span between said first and second amplifier stages.

17. The system of claim 15 in which said amplifier includes first and second amplifier stages, said first filter being associated with said first amplifier stage, said second filter being associated with said second amplifying stage, and said first filter and first amplifier stage being separated from said second filter and second amplifier stage by a fiber span.

18. The system of claim 17 in which each of said first and second filters includes a series of filter components having approximately Gaussian response profiles, and said filter components of the first and second filters have central wavelengths that are shifted in opposite directions.

19. The system of claim 15 in which said second filter is tuned to offset its peak variation in a direction opposite to the direction of offset of said peak variation of the first filter.

20. The system of claim 15 in which one of said first and second filter is dynamically tuned to compensate for changing gain variations.

21. The system of claim 15 in which each of said first and second filters includes a series of filter components having approximately Gaussian response profiles, and one of said filter components of each of the first and second filters have central wavelengths that are shifted in opposite directions.

22. The system of claim 15 in which each of said first and second filters is comprised of a series of long period gratings.

23. An optical amplifying system comprising:
   an optical amplifier exhibiting a variation in gain over a domain of wavelengths;
   a plurality of pairs of long period gratings;
   each pair including two long period gratings that exhibit spectral responses with central wavelengths matched to a desired central wavelength of the pair for reducing gain variations of the optical amplifier;
   one long period grating member of each pair belonging to one of two similar sets of long period gratings and the other long period grating member of each pair belonging to the other of the two similar sets of long period gratings; and
   said central wavelengths of the two long period gratings of a first of said pairs being offset in opposite directions with respect to the desired central wavelength for reducing the variation in gain with respect to similar offsets of said central wavelengths in the same direction with respect to the desired central wavelength.

24. The system of claim 23 in which each of said sets of long period gratings is arranged to fit a common algorithm for producing a combined spectral response that reduces the gain variation of the optical amplifier.

25. The system of claim 24 in which the desired central wavelengths of each pair are determined by the common algorithm.

26. The system of clam 23 in which the long period grating members of each set are offset in the same direction.

27. The system of claim 26 in which the long period grating members of one set are positioned together and separated from the long period grating members of the other set.

28. The system of claim 27 in which said amplifier includes first and second amplifier stages, the one set of long period gratings being located with said first amplifier stage, and the other set of long period gratings being located with said second amplifying stage.

29. The system of claim 23 in which one of said long period gratings is tuned to provide the desired direction of central wavelength offset from the central wavelength offset of its paired long period grating.

30. A method of reducing gain variation in an optical amplification system comprising the steps of:
   determining a desired filter loss spectrum;
   fitting the desired filter loss spectrum with a series of filter components having individual spectral responses centered at different specified wavelengths;
   fashioning at least a first of the filter components from at least two filter sub-components with similar spectral responses; and
   arranging the filter sub-components so that the central wavelengths of the two filter sub-components are offset in opposite directions with respect to the specified wavelength of the first filter component for better matching the desired loss spectrum despite variations in the central wavelengths of the filter sub-components.

31. The method of claim 30 in which the individual spectral responses of the filter components have Gaussian profiles, and said step of fitting includes executing an algorithm.

32. The method of claim 30 in which said step of fashioning includes also fashioning a second of the filter components from at least two filter sub-components with similar spectral responses.

33. The method of claim 32 in which said step of arranging includes arranging. the filter sub-components of the second filter so that the two filter sub-components of the second filter are offset in opposite directions with respect to the specified wavelength of the second filter component.

34. The method of claim 33 including the further steps of grouping said filter sub-components of the first and second filter components that are offset in a first direction from the specified wavelengths into a first set of filter components and grouping said filter sub-components of the first and second filter components that are offset in a second direction from the specified wavelengths into a second set of filter sub-components.

35. The method of claim 34 including the further steps of separating two amplifiers of the amplification system by a fiber span, locating the first set of filter sub-components within one of the amplifiers, and locating the second set of filter sub-components within the other of the amplifiers.

36. The method of claim 30 in which said step of fashioning includes fashioning the first of the filter components from at least a pair of long period gratings with similar spectral responses.

37. The method of claim 30 in which said step of fashioning includes also fashioning the other filter components of the series from at least pairs of filter sub-components with similar spectral responses.

38. The method of claim 37 in which said step of arranging the filter sub-components includes sorting the filter sub-components into a first group that are offset in a first direction with respect to the specified wavelength and into a second group that are offset in a second direction with respect to the specified wavelength.

39. The method of claim 37 in which said step of arranging includes dividing the filter sub-components of each pair into first and second sets of filter sub-components and including among the filter sub-components of the first set a filter sub-component with a central wavelength that is offset from a specified wavelength in a first direction.

40. The method of claim 39 in which said step of arranging includes tuning a corresponding filter sub-component of the second set so that the tuned filter sub-component is offset from the specified wavelength in a second direction.

41. A method of making a compound gain flattening filter comprising the steps of:
   approximating a predetermined filter loss spectrum with a plurality of spectral response profiles having prescribed central wavelengths;
   fabricating a plurality of filter components having similar response profiles and central wavelengths that at least approximately correspond to the prescribed central wavelengths; and
   forming at least a first of the filter components with at least two filter sub-components having similar response profiles and central wavelengths that are offset in opposite directions from the prescribed central wavelength of the first filter component.

42. The method of claim 41 in which said step of approximating includes approximating the predetermined filter loss spectrum with a plurality of Gaussian spectral response profiles.

43. The method of claim 41 in which said step of forming includes forming the first filter component with at least two long period gratings.

44. The method of claim 43 in which other of said filter components are also formed by long period gratings.

45. The method of claim 41 in which said plurality of filter components are formed by at least pairs of filter sub-components having similar response profiles.

46. The method of claim 45 in which one member of each pair forms a first set of filter components, and the other member of each pair forms a second set of filter components, and further comprising the step of separating the first and second sets of filter components.

47. The method of claim 41 in which said step of forming the first filter component includes selecting among a plurality of filter sub-components for a pair of filter components having central wavelengths that are offset in opposite directions.

48. The method of claim 41 in which said step of forming the first filter component includes tuning at least one of a pair of filter components to produce central wavelengths that are offset in opposite directions.

49. A compound optical filter comprising:
   at least first and second sets of filter sub-components together approximating a single set of filter components defined by a best fit algorithm that determines central wavelengths of response for the filter components to approach a desired spectral filter response;
   at least one sub-component of said first set exhibiting a central wavelength of response shifted in a positive direction from the central wavelength of a corresponding component determined by the best fit algorithm;
   at least one sub-component of said second set exhibiting a central wavelength of response shifted in a negative direction from the central wavelength of the same corresponding component determined by the best fit algorithm; and
   said at least first and second sets being combined for producing an actual spectral filter response that is closer to the desired filter response than a filter response of the single set of filter components in which the corresponding filter component exhibits an actual central wavelength similarly shifted in either direction from the central wavelength determined by the best fit algorithm.

50. The filter of claim 49 in which said filter sub-components of the first set exhibit individual filter responses at least approximately matching individual filter responses of paired sub-components from said second set of filter sub-components.

51. The filter of claim 50 in which central wavelengths of more than one pair of filter sub-components from the first and second sets are shifted in opposite directions with respect to central wavelengths of the corresponding component responses determined by the best fit algorithm.

52. The filter of claim 49 in which the best fit algorithm also determines peak losses of the component responses, and peak losses exhibited by the sub-components from both sets sum to the peak losses of the corresponding components determined by the best fit algorithm.

53. The filter of claim 49 in which at least some of said filter sub-components exhibit approximately Gaussian response profiles.

54. The filter of claim 49 in which at least some of said filter sub-components are long period gratings.

55. A compound optical filter comprising:

a series of filter components that produce a combined filter response approximating a desired spectral filter response;

each of said filter components exhibiting a substantially different filter component response than other of said components of the series;

said one component being divided into at least two sub-components having similar response profiles that are summed for producing one of the different filter component responses; and said response profiles of the sub-components being relatively shifted in wavelength in opposite directions to better approximate the desired spectral filter response than if the filter component response of the one component were similarly shifted in a single direction.

56. The filter of claim 55 in which said response profiles of the sub-components each contribute approximately one-half of a total attenuation exhibited by the filter component response of the one component.

57. The filter of claim 55 in which said response profiles of the sub-components are relatively shifted in wavelength by less than one nanometer.

58. The filter of claim 55 in which said response profiles of the sub-components include respective peak losses that are shifted in wavelength by less than one nanometer.

59. The filter of claim 55 in which said sub-components are long period gratings.

60. The filter of claim 59 in which other of said filter components also include long period gratings.

61. The filter of claim 55 in which each of said filter component responses has a Gaussian profile.

* * * * *